April 7, 1964 R. DENK 3,127,809
SINGLE LENS REFLEX MOTION PICTURE CAMERA
Filed Feb. 10, 1961
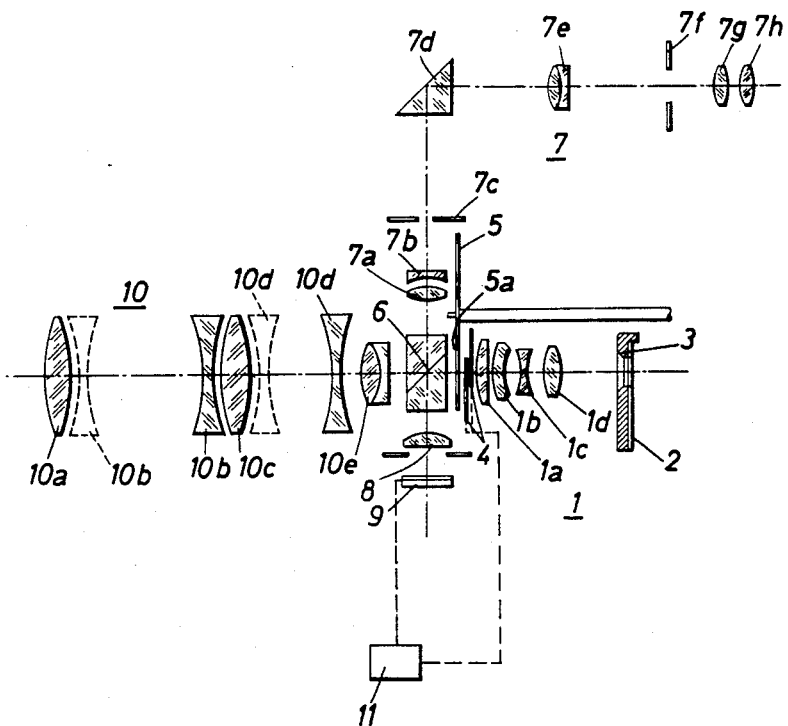
INVENTOR.
RICHARD DENK
BY Connolly and Hutz
his attorneys 3,127,809
SINGLE LENS REFLEX MOTION PICTURE
CAMERA
Richard Denk, Munich, Germany, assignor to Agfa Aktiengesellschaft, Leverkusen-Bayerwerk, Germany, a corporation of Germany
Filed Feb. 10, 1961, Ser. No. 88,354
Claims priority, application Germany Feb. 27, 1960
5 Claims. (Cl. 88—16)

This invention relates to a single lens reflex motion picture camera in which interchangeable supplementary lenses are attached in front of the main objective lens, and it more particularly relates to such a camera in which a semi-transparent mirror is positioned toward the object in front of the main lens.

The light measuring elements of some motion picture cameras incorporating automatic exposure regulating devices are exposed to a sample of light which is not identical to the light which enters the objective lens of such cameras. When interchangeable lenses are used with such cameras, the angle of incidence of light upon the light measuring element can only be adjusted to the angle of view of the various lens combinations by the use of complicated supplementary devices. In attempting to avoid this complication, some motion picture cameras swing a photo-electric cell intermittently into the path of light entering the objective lens. This makes it possible for the photo-electric cell to accurately measure the amount of light passing through the objective lens independent of its focal length. However, this arrangement does not permit the diaphragm of the camera to be automatically regulated in accordance with light conditions existing at the time of the exposure because the photoelectric cell must be completely removed from the path of the rays entering the objective lens before the exposure can be commenced.

An object of this invention is to provide a single lens motion picture camera which accurately samples the light passing through the objective lens at the time of exposure.

Another object is to provide such a camera which maintains its accuracy without adjustment when interchangeable supplemental lenses are used.

In accordance with this invention a rotary shutter having a reflective surface disposed toward the object is positioned between the semi-transparent mirror of a single lens reflex motion picture camera and the main objective lens. Immediately prior to the exposure of each frame of film, the reflective surface of this rotary shutter reflects the light rays from the object back through the semi-transparent mirror upon a light measuring means in a direction which is 180° opposite to the light rays from the object which are reflected through the semi-transparent mirror to the viewfinder. This insures that the light measuring means receives an amount of light corresponding to the light which passes through the main objective lens without adjustment even if a supplementary lens is attached in front of the main objective. This arrangement is particularly advantageous when the light measuring means is connected to actuate an automatic diaphragm controlling device.

In accordance with one form of this invention a lens may be provided between the semi-transparent mirror and the light measuring means for maintaining the angle of incidence of light upon the light measuring means substantially equal to the angle of view of the main objective lens whether or not supplementary lenses are attached in front of it. This arrangement is particularly advantageous when a supplementary lens of the zoom type is used. The angle of view of the lens concentrating light upon the photocell is accordingly maintained substantially equal to the combined angle of view of the main objective lens and the zoom lens.

This invention accordingly insures that the light rays incident upon the photocell maintain an effective angle which always corresponds to the angle of view of the objective lens of the camera. This relationship is maintained whether or not the main objective lens alone is utilized for an exposure or whether it is used in conjunction with supplementary lenses. The use of supplementary lenses therefore does not require adjustment of either the photocell or the lens positioned in front of it relative to the semi-transparent mirror for maintaining accurate measurement of exposure. This invention is therefore particularly well suited for use in conjunction with zoom lens attachments whose focal length is frequently varied. Previously, it was necessary to utilize an expensive detachable coupling device between the photocell or the lens in front of it and the zoom lens attachment to avoid the necessity of continuously adjusting the photocell in accordance with the varying focal length of the zoom lens; and, even so, it was not possible to maintain complete accuracy of exposure measurement. In contrast, this invention even permits the exposure measuring device to be directly connected to an automatic diaphragm-regulating device because the amount of light entering the photocell need not be adjusted at any time.

Novel features and advantages of the present invention will become apparent to one skilled in the art from a reading of the following description in conjunction with the accompanying drawings wherein similar reference characters refer to similar parts and in which the single figure is a schematic diaphragm in elevation of one embodiment of this invention.

The main objective lens 1 of a motion picture camera of the single reflex type includes a number of components designated 1a, 1b, 1c and 1d. A film plane surface 2 is arranged in back of the image aperture 3 upon a guide element. An exposure-regulating diaphragm 4 is positioned toward the object in front of main objective lens 1, and a rotary shutter 5 is disposed in front of both of them. The apertured shutter disc of rotary shutter 5 has a surface toward the objective which is totally reflective. A semi-transparent mirror 6 is positioned in front of rotary shutter 5 in the path of the light rays entering main objective lens 1 from the image. This semi-transparent main mirror 6 reflects part of the light from the object through reflex finder 7 which includes elements 7a—7h which are constructed and arranged to provide an image in the viewfinder which is substantially identical to that which impinges upon the film.

When rotary shutter 5 occupies those positions in which it interrupts the light from passing through main objective lens 1 upon the film, its mirror surface 5a reflects light rays from the object in an opposite direction through semi-transparent mirror 6. Semi-transparent mirror 6 accordingly directs these light rays toward lens 8 which concentrates and focuses them upon photocell 9 of an exposure measuring device such as a light meter. Lens 8 is constructed and arranged to provide an angle of incidence or view for the light rays impinging upon photocell 9 which corresponds to the same angle of image or view as the light rays impinging upon the film through main objective lens 1. Semi-transparent mirror 6 is therefore used both for reflecting part of the light originating from the object into viewfinder 7 and for directing light upon photocell 9. It is also advantageous to utilize photocell 9 for actuating an automatic exposure regulating device 11 which automatically adjusts the opening of diaphragm 4 in accordance with the light measured by photocell 9. However, photocell 9 may also be part of an exposure meter or a semi-automatic exposure regulating device which incorporates a manually-operated pointer which is adjusted by the operator to the position of the moving pointer of the light meter. This arrangement is advantageous in all of these types of devices whether or not the exposure meter is directly connected to adjust the diaphragm. It insures that the angle of incidence or image of the light impinging upon the light measuring device accurately corresponds to the angle of image or view of the main objective lens without requiring that the photocell be continuously moved in and out of the path of rays entering the main objective lens. When the focal length of the lens system of the camera is to be changed, a lens attachment 10, such as a variable focal length zoom lens, is attached in front of main objective lens 1. This supplementary lens 10 varies the angle of image of the light rays impinging upon photocell 9 in a manner which corresponds to the change that it causes in the angle of view of the main objective lens system of the camera. It is, therefore, not necessary to change either the distance of photocell 9 or that of lens 8 from the semi-transparent mirror to maintain the aforementioned corresponding relationship between the angles of image of the light impinging upon the film and photocell.

Supplementary lens 10 shown in the drawing consists, for example, of a zoom lens system 10a—10e. The solid line positions of lenses 10b and 10d correspond to the longer extremity of the focal length of lens 10, and the broken line positions of 10b and 10d correspond to the shorter focal length extremity of zoom lens systems 10a—10e and accordingly of the combined photo objective lens combination 10 and 1. As previously mentioned, there are no changes in the position of photocell 9 required to adjust the angle of image of the light impinging upon it for any focal length to which zoom lens system 10a—10e is set. This avoids the necessity of providing any complicated adjustable coupling device or the space for it.

This invention is advantageous whether or not zoom lens attachments are utilized. It is also helpful to avoid any necessity for adjusting an exposure meter when the usual wide angle and telescopic supplementary lenses are used because such adjustments are easily overlooked, and special devices for automatically adjusting the exposure meter when these wide angle or telescopic supplementary lenses are attached are quite complicated. These special devices are also quite expensive and require considerable space for mounting them.

In cameras where the rotary shutter itself is adapted for setting different exposure times, it is also possible to connect an automatic exposure-regulating device actuated in accordance with this invention to control the exposure times adjusted by such rotary shutters when suitable provisions are made.

What is claimed is:

1. A single lens reflex motion picture camera comprising an objective lens including a main objective lens and provisions for mounting interchangeable supplementary lenses in front of said main objective lens, a semi-transparent mirror positioned toward the object in front of said main objective lens which transmits part of said light from said object along the optical axis of said camera, a rotary shutter mounted between said semi-transparent mirror and said main objective lens, the surface of said rotary shutter facing said object being reflective, said semi-transparent mirror reflecting an other part of the light rays originating from said object in a direction which is angularly displaced from said optical axis of said camera and reflecting part of the light rays from said reflective surface of said reflective shutter in a direction which is 180° opposite to said reflected direction of said light rays from said object, a viewfinder disposed in the path of said other part of the light rays reflected by the said semi-transparent mirror from said object, and light-measuring means disposed in the path of said light rays reflected by said semi-transparent mirror from said rotary shutter whereby the amount of light impinging upon said light-measuring means is maintained in correspondence with the light passing through said objective lens regardless of any change in overall focal length.

2. A motion picture camera as set forth in claim 1 wherein an automatic means is provided for regulating the diaphragm of said camera and said light-measuring means being connected to said automatic means for causing said diaphragm to be automatically regulated in accordance with the light directed into said camera through said objective lens.

3. A motion picture camera as set forth in claim 1 wherein a collecting and concentrating lens is positioned between said semi-transparent mirror and said light-measuring means for maintaining the angle of incidence of light upon said light measuring means substantially equal to the angle of view of said objective lens regardless of any change in its focal length.

4. A motion picture camera as set forth in claim 1 wherein a supplementary lens is positioned in front of said main objective lens, and said supplementary lens being a zoom lens.

5. A motion picture camera as set forth in claim 1 wherein said semi-transparent mirror is inclined at an angle of approximately 45° to said optical axis of said camera, and said other part of said light rays reflected from said object and said light rays reflected from said reflective surface of said reflective shutter being directed at angles approximately 90° to said optical axis of said camera.

References Cited in the file of this patent

UNITED STATES PATENTS

| | | |
|---|---|---|
| 1,573,401 | Heine | Feb. 16, 1926 |
| 1,934,484 | Camilli | Nov. 7, 1933 |
| 1,957,128 | Ball et al. | May 1, 1934 |
| 3,072,035 | Martin | Jan. 8, 1963 |

FOREIGN PATENTS

| | | |
|---|---|---|
| 864,198 | Germany | June 22, 1953 |
| 1,094,585 | Germany | Dec. 8, 1960 |